United States Patent [19]

Rickmann

[11] Patent Number: 4,531,174
[45] Date of Patent: Jul. 23, 1985

[54] DRAW-OUT CIRCUIT BREAKER WITH IMPROVED EXTERNAL CONNECTORS

[75] Inventor: Bernard C. Rickmann, Peru, Ind.

[73] Assignee: Square D Company, Palatine, Ill.

[21] Appl. No.: 613,478

[22] Filed: May 24, 1984

Related U.S. Application Data

[62] Division of Ser. No. 315,566, Oct. 27, 1981, Pat. No. 4,491,896.

[51] Int. Cl.³ .............................................. H02B 11/12
[52] U.S. Cl. .............................. 361/339; 200/50 AA; 339/256 S; 361/338
[58] Field of Search ..................... 339/265 S; 361/335, 361/338, 353, 355, 376, 391; 200/248–251, 258–261, 237–238, 276

[56] References Cited

U.S. PATENT DOCUMENTS 4,462,657  7/1984  Snowdon et al. ............... 339/265 S

FOREIGN PATENT DOCUMENTS 1094659  1/1981  Canada ........................... 339/256 S
1542102  3/1979  United Kingdom ............ 339/256 S Primary Examiner—A. D. Pellinen
Assistant Examiner—Greg Thompson
Attorney, Agent, or Firm—Richard T. Guttman; Larry I. Golden

[57] ABSTRACT

An improved draw-out circuit breaker assembly for use in a switchboard with means for automatically tripping the breaker upon removal of the breaker from a fully engaged position within the switchboard and maintaining the breaker in the "TRIP" position until the terminal connectors of the breaker are separated by a predetermined distance from respectively associated connectors of the switchboard. A cam operated pivotable arm is connected to a push-to-trip button of the breaker and is biased to a first position. A cam link having an edge portion engaged with the arm and also including a cam surface is biased in a first position by the arm. A barrier surface is mounted within the switchboard to deflect the cam surface and move the link to a second position which in turn moves the pivotable arm against the bias to a second position, moving the push-to-trip button to its tripping position, which effects tripping of the circuit breaker. Each terminal connector of the breaker includes a top surface and a bottom surface which have a recessed channel area in which is secured a retaining clip having a leg extending along the longitudinal axis of a helical coil. Each channel includes a ridge portion extending perpendicular to the leg at opposite ends of the leg, with a portion of each ridge being crimped to retain the clip within the channel.

4 Claims, 10 Drawing Figures

DRAW-OUT CIRCUIT BREAKER WITH IMPROVED EXTERNAL CONNECTORS

This application is a division, of application Ser. No. 315,566, filed 10/27/81 now U.S. Pat. No. 4,491,896.

BACKGROUND OF THE INVENTION

1. Field of the Invention

This invention is a division of application Ser. No. 315,566, filed Oct. 27, 1981 and relates to a molded-case draw-out circuit breaker used in a switchboard, and more particularly, to a molded-case draw-out circuit breaker having improved terminal connectors and means for automatically tripping the circuit breaker upon removal of the circuit breaker from the switchboard.

2. Description of the Prior Art

Switchboards often include circuit breakers having externally accessible manual tripping means as shown in Layton Pat. No. 3,480,890, issued Nov. 25, 1969 which has been assigned to the same assignee as the instant invention. This feature facilitates tripping of the operating mechanism after final installation of the breaker to be sure that the operating mechanism is fully operative. Breakers of this type are generally provided with connectors extending outward from the line and load terminals which are adapted to be received by respective line and load terminal connectors within the switchboard. Connectors of the type described in copending application Ser. No. 200,814, filed on Oct. 27, 1980 by F. E. Chabot, for a Low Resistance Connecting Electrical Assembly, may be used to make the connection between the terminals of the circuit breaker and the switchboard. It is highly desirable, however, that the circuit breaker be in the tripped position while being disengaged from the switchboard and, upon insertion, it is desirable that the breaker be in the tripped position until the connectors of the breaker are fully engaged with the connectors of the switchboard.

SUMMARY OF THE INVENTION

The present invention provides improved external connectors for the line and load terminals of the breaker which are adapted for sliding engagement with respective line and load connectors of the switchboard. The circuit breaker connectors include generally rectangular bar portions extending outward from the rear of the circuit breaker case, each portion including an extruded channel on opposite sides of the bar extending from a point substantially near the breaker case to a point substantially near the outermost end of the connector. A generally pi-shaped metal clip is captured within each extruded channel by a crimp at opposite ends of each channel. A helical spring is retained about each leg of the clip. Upon contact with the mating female connector, the spring will be drawn to an extended position fostering low resistance contact with high interrupting capacity.

The breaker is also provided with an automatic tripping means which actuates an externally accessible tripping means and prevents the breaker from assuming an "ON" position, while the breaker is being inserted, until the circuit breaker is fully engaged within the switchboard.

It is an object of this invention to provide readily assemblable, low resistance, high interrupting capacity, plug-in terminal connectors.

It is a further object of the instant invention to effect automatic tripping of the circuit breaker upon removal of the breaker from full engagement within the switchboard.

It is another object of the present invention to prevent the breaker from assuming an "ON" position, upon installation, prior to full engagement of the breaker within the switchboard.

Further objects and advantages will become apparent from the following Description and Claims taken together with the Drawings.

DESCRIPTION OF THE PREFERRED EMBODIMENT

Figure 1:
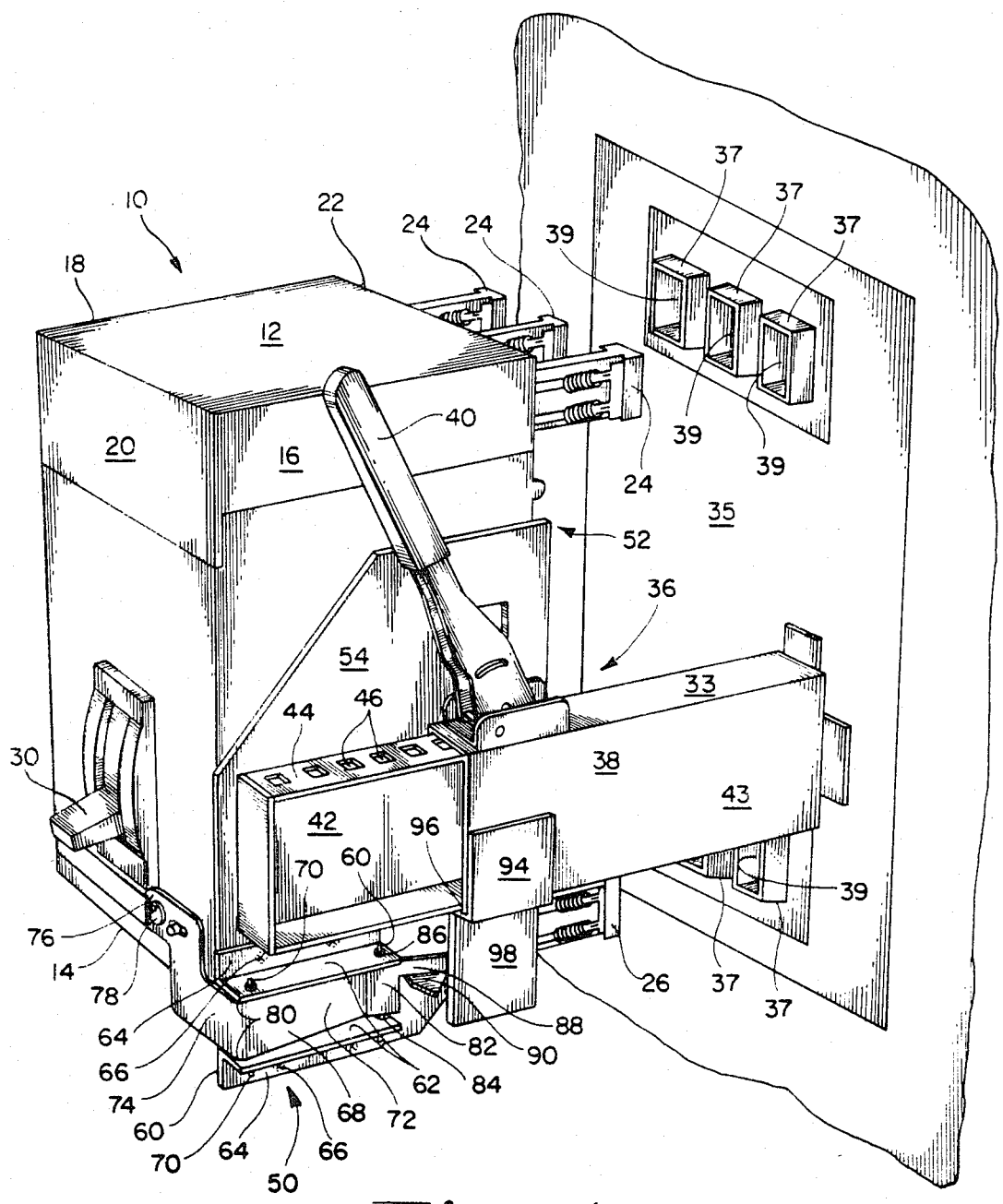
FIG. 1 is a perspective view of a molded case draw-out breaker including the terminal connectors and automatic tripping features in accordance with the instant invention.
Figure 2:
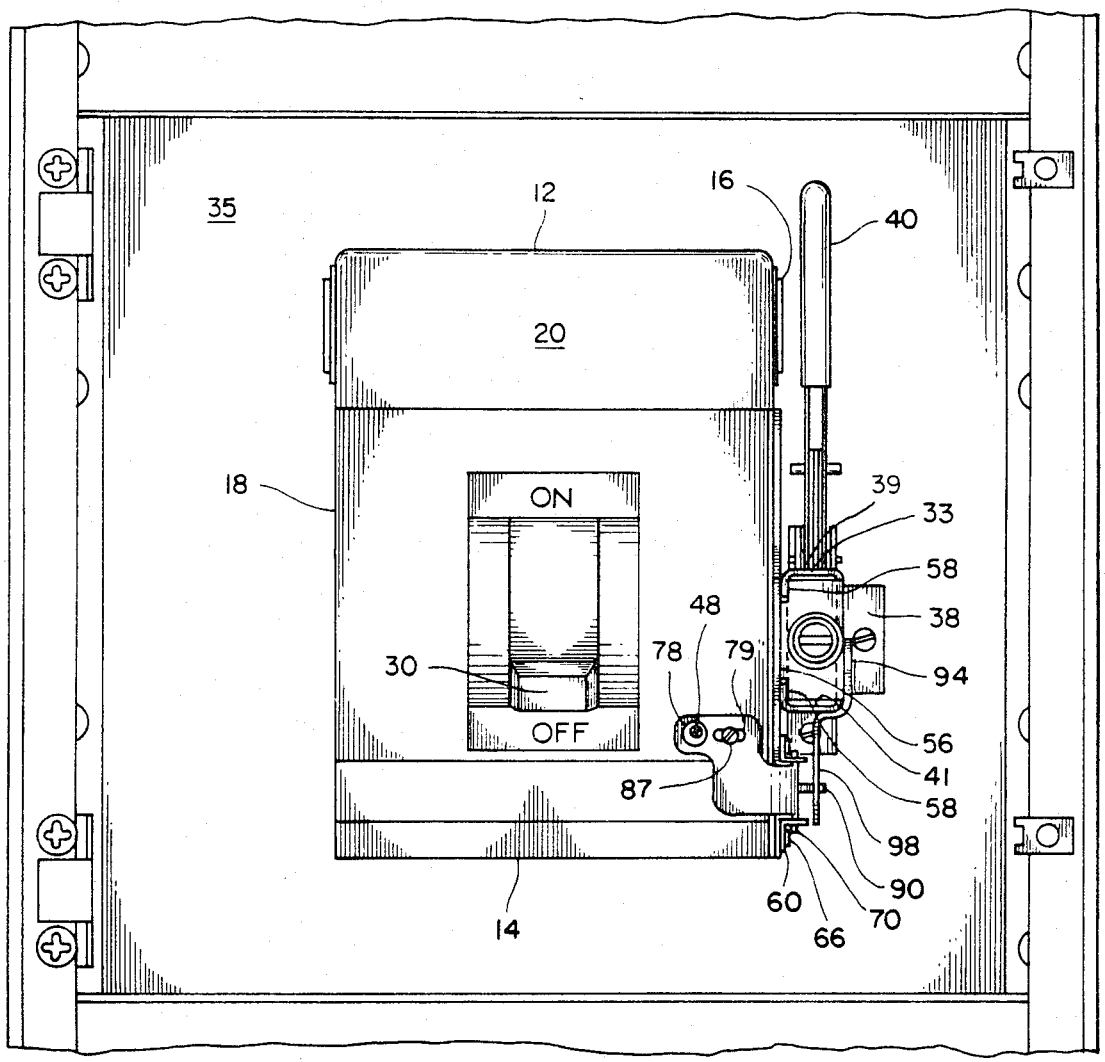
FIG. 2 is a front view of the circuit breaker incorporating the features of the instant invention.
Figure 3:
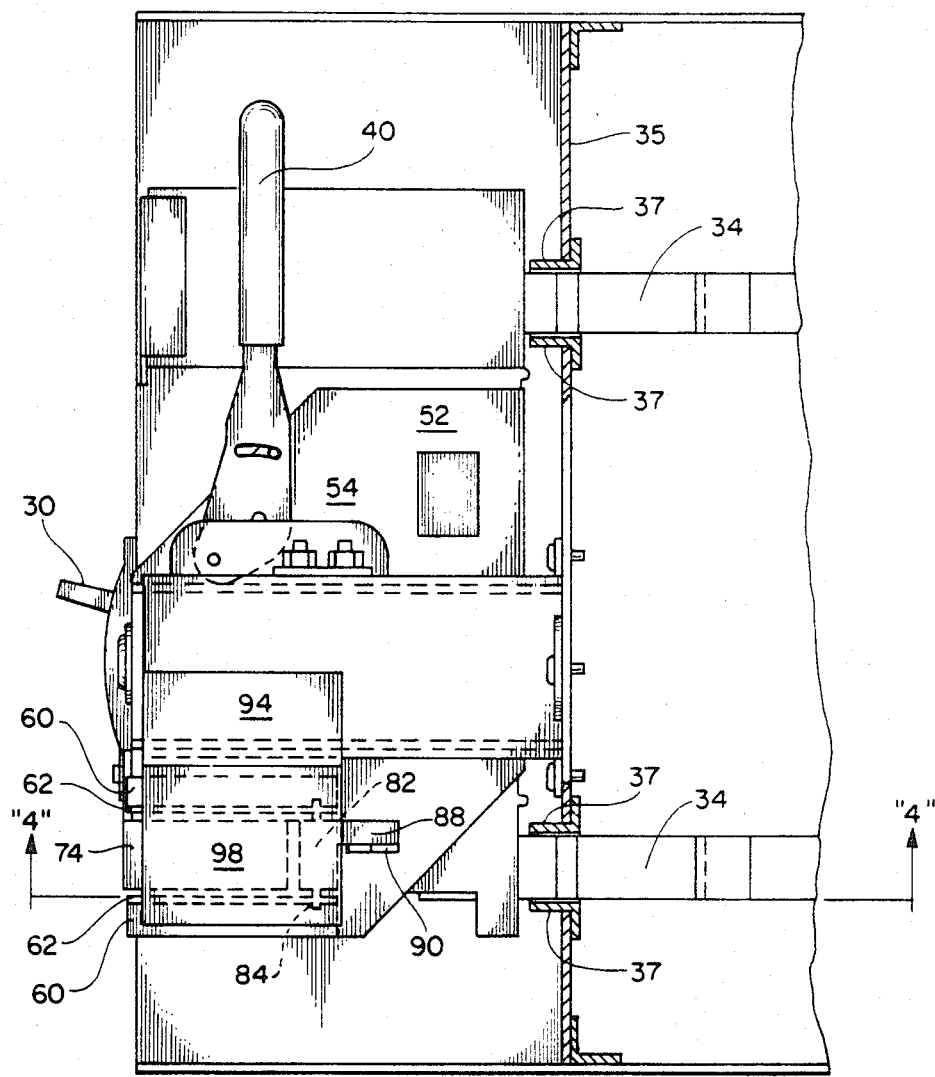
FIG. 3 is a side view of a fully engaged breaker incorporating the features of the instant invention.

For exemplary purposes, the invention is described with respect to a three pole molded case draw-out circuit breaker shown generally as reference character 10 in FIG. 1. The breaker has a top surface 12, a bottom surface 14, a first side surface 16, a second side surface 18, a front surface 20, and a rear surface 22. Each breaker includes a set of connectors 24 extending from the line terminal and a set of connectors 26 extending from the load terminal. The load terminals 28 of the breaker can be seen in FIG. 4 with connectors 26 being electrically connected thereto by means of screw 29 which is received in a tapped hole in base portion 31 of each connector. A handle 30 having an "ON", "OFF" and "TRIP" position extends through the front portion 20 of the molded case.

The breaker includes externally accessible manual tripping means of the type described in the aforementioned Layton Patent which is incorporated herein by reference. The instant circuit breaker is designed to plug into a switchboard environment having female line and load connectors 34 aligned for respective receipt of male line and load connectors 24 and 26 which extend outward from the breaker. Connectors 34 are recessed behind an interior rear wall 35 of the switchboard and insulating frames 37 provide a channel 39 through which the respective male connectors pass before being received by connectors 34. As can be seen in FIG. 1, the circuit breaker 10 can be drawn in or out through the use of a ratchet assembly 36 which includes a generally C-shaped main channel bracket 38 mounted at a back end to the wall 35 of the switchboard in a cantilever fashion. Bracket 38 has a top surface 39, a bottom surface 41 and an intermediate surface 43. A handle 40 is connected to the top surface 39 at the forward end thereof, away from wall 35. A bracket 42 is mounted on the side 16 of the breaker and is adapted to be received within the channel of bracket 38. An upper surface 44 of bracket 42 extends perpendicular to side surface 16 of the breaker and is provided with a plurality of spaced apart openings 46 which are adapted to receive a tooth member (not shown) of handle 40 for the purpose of ratcheting the breaker in and out of engagement within the switchboard.

As will be hereinafter described, the instant invention is provided with means for automatically tripping the breaker upon removal of the breaker from the switchboard. Upon insertion, the breaker is also maintained in the tripped position until it is fully engaged within the switchboard.

Although the Layton Patent requires that an instrument be used to push a trip-pin which includes a head that is slightly recessed from the face 20 of the breaker, the instant invention provides an extension screw 48 which is controlled by the automatic trip assembly 50 to effect automatic trip of the breaker upon insertion and withdrawal of the breaker.

A generally L shaped mounting bracket 52 is secured to the rear side 22 of the breaker having a leg 54 extending along side 16 of the breaker. Bracket 52 may be secured along the rear side by rivets, screws or some other fastening means. Bracket 42 is welded to a spacer bar 56 which in turn is mounted to leg 54, thereby providing space between bracket 42 and leg 54, along the top and bottom portions of bracket 42, in which bent flange portions 58 of channel bracket 38 may be received.

A pair of L-shaped support rails 60 include a support leg portion 62 and a mounting leg portion 64. The mounting leg portions 64 of the support rails 60 are secured to leg 54 of bracket 52 by screws 66 or some other fastening means at a point adjacent screw 48, with the mounting portions 64 of each rail facing opposite directions and support leg portions 62 extending parallel to each other and parallel to the top surface 12 and bottom surface 14 of the breaker.

A generally L shaped arm 68 including a first arm segment 72, and a second arm segment 74 bent approximately 90 degrees is pivotally supported between the support rails 62 by integrally formed tangs 70 extending from opposite sides of the first arm segment 72 adjacent to the bend in the arm. The tangs 70 of arm 68 extend through openings 80 located on the front portion of support rail 62. The second arm segment 74 of arm 68 includes an offset connecting portion 76 which includes an aperture 78 and an elongate passage 79 extending laterally along offset portion 76 A generally oval shaped connecting link 81 is provided with a pair of threaded apertures 83 and 85. A screw 87 extends through passage 79 and is threadingly received by aperture 83. The screw 87 retains link 81 in engaged relationship with offset portion 76, intermediate said second arm segment 74 and the front surface 20 of the breaker. The second aperture 85 threadingly receives screw 48. Aperture 78 provides an opening in arm segment 74 through which screw 48 may extend and is large enough to permit adjustment of link 81 either pivotally about screw 87 or laterally by moving screw 87 within passage 79.

Figure 4:
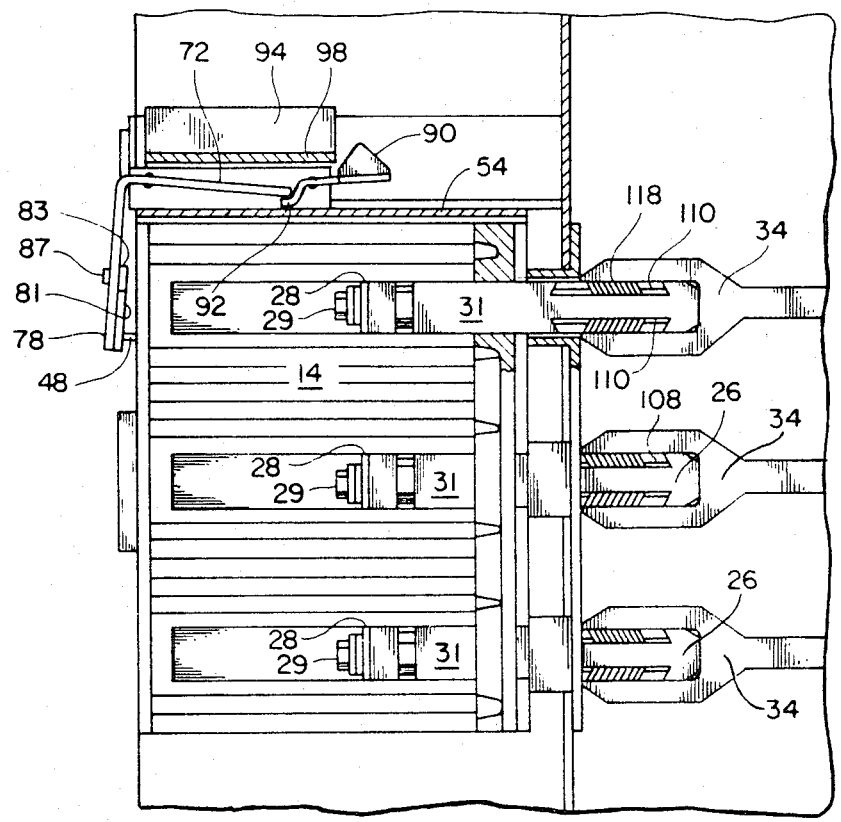
FIG. 4 is a sectional view of the circuit breaker assembly taken along lines 4—4 shown in FIG. 3 while the connectors of the breaker are fully engaged within the switchboard.
Figure 5:
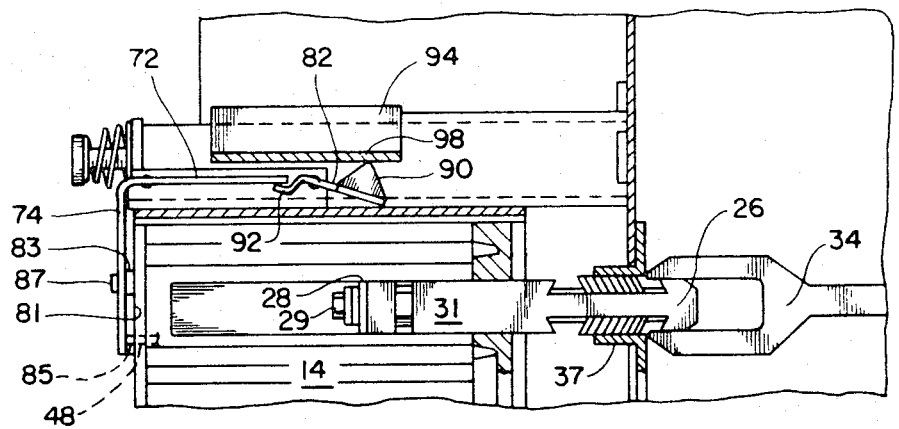
FIG. 5 is a sectional view of the circuit breaker assembly as shown in FIG. 4 while the connectors of the breaker are partially engaged within the switchboard.
Figure 6:
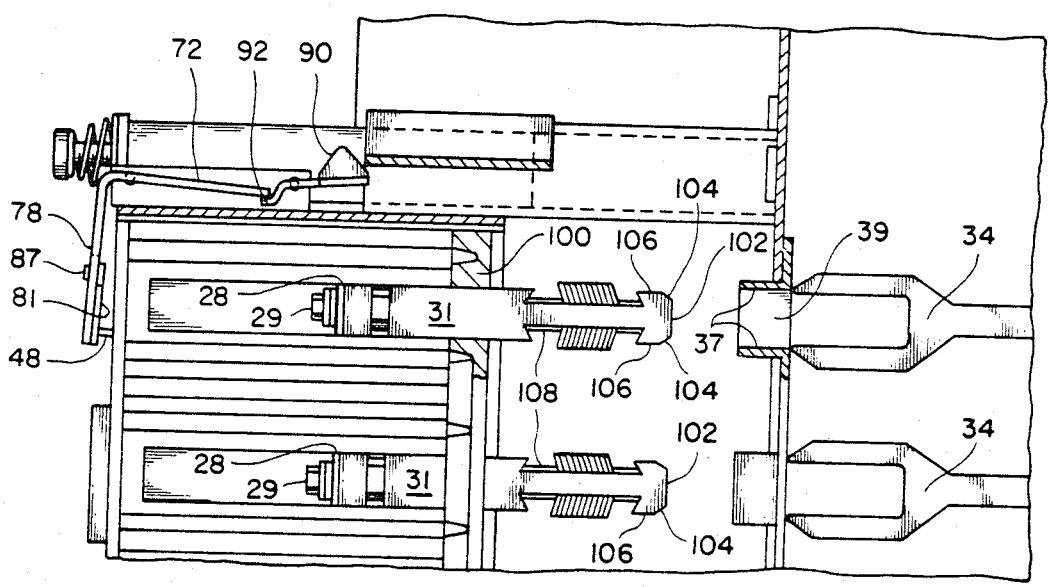
FIG. 6 is a sectional view of the breaker assembly as shown in FIG. 4 prior to engagement of the connectors within the switchboard.

A cam link 82 is similarly supported by integrally formed tangs 84 through openings 86 located at the rearward side of the support rail 62. A narrow strip portion 88 of cam link 82 extends from the support rails 60 rearward toward the rear surface 22 of the breaker, with a generally triangular cam surface extending perpendicular and away from side 16 of the breaker. As best seen in FIGS. 4, 5, and 6, the cam link further includes an offset tang 92 which extends between support rails 60 and engages the under-side edge of arm segment 72.

The cantilevered channel support 38 includes a barrier 94 welded to intermediate surface 43 thereof. Barrier 94 has a portion that is engaged with the lower outward portion of surface 43, includes a strip 96 which extends inward toward the circuit breaker and then continues downward providing a lower barrier portion 98 aligned with cam 90 of link 82.

The trip screw 48 which extends from the trip button that is biased in an outward direction causes link 81, offset portion 76 and arm segment 74 to be positioned away from circuit breaker face 20 thereby pivoting arm segment 72 about tangs 80 in the downward direction toward side 16 of the breaker whereby tang 92 of cam link 82 is biased toward the breaker side causing strip portion 88 and cam 90 to pivot about tangs 84 away from side 16 of the circuit breaker to an outward position. So long as portion 76 of arm 68 is in an outward position, thereby downwardly biasing outer end of arm segment 72 against tang 92, the circuit breaker may assume an "ON", "OFF" or "TRIP" position.

In operation, however, upon inserting the circuit breaker to an engaged position by sliding bracket 42 within the C-shaped channel formed by the surfaces of bracket 38, the cam surface 90 abuts against barrier portion 98 causing cam link 82 to rotate about tangs 84, bringing narrow strip portion 88 downward toward side 16 of the breaker, thereby urging tang 92 upward against arm segment 72 in the direction away from the breaker, causing arm 68 to rotate about tangs 70, moving arm segment 74 downward toward the front surface 20 of the circuit breaker, whereby screw 48 is moved inward against its the biasing force imparted to the trip pin to effect tripping of the breaker.

The barrier portion 98 is arranged to abut against cam portion 90 at some point before connectors 24 and 26 reach their respective terminals identified by 34. The barrier must continue to engage the cam surface so long as the circuit breaker is being racked into its operating position, at which time the cam portion must be free to move to its outward position, permitting the breaker to be put in the "ON" and "OFF" positions. The breaker is hereby provided with a mechanical sensing means for tripping the breaker upon removal of the breaker from the switchboard and maintaining the breaker in a "TRIP" position until the breaker has been removed a predetermined distance from the electrical connection with the switchboard. Similarly, the mechanical sensing means prevents insertion of the breaker to connection with the switchboard while the breaker is on an "ON" position.

The circuit breaker/switchboard connection must provide a low resistance connection and maintain a high interrupting capacity. The male connectors 24 and 26 are generally rectangular aluminum blocks with a base 31 connected to respective terminals as shown in FIG. 6 through the use of screw 29. The base 31 of the connectors is also snuggly retained in position by the insulating casing 100 of the breaker. A flame retardant vinyl tubing may be heated to shrink about the base of the connector providing an intermediate layer between the connector and casing 100 of the breaker. Each male connector has an outer surface 102 with opposite beveled edges 104 which lead into top and bottom surfaces 106. A channel 108 is extruded from each surface 106 forming back-to-back channels on each connector. A generally pi shaped metal clip 110 includes a top strip 112 and a pair of depending legs 114. The distal portion 116 of each leg is bent downward as is the strip 112 with respect to legs 114. Each leg 114 extends through the center of a helical coil 118 which provide a plurality of resilient contact surfaces. At the end of each coil 118 is an up-turned end portion 120 which extends through a hole 122 provided in each leg 114 adjacent strip 112. After the coils 118 are placed in position about legs 114, the ends 120 are pushed through holes 122 and the end is then bent downward to retain the coil at the top end of the clip 110. The clip and spring assembly is then slid into the channel 108 of the connector where it is retained under ridges 124. The interior portion 126 of each ridge is then crimped to provide a crimped portion which securely retains the clip and helical contacts within channel 108.

Figure 7:
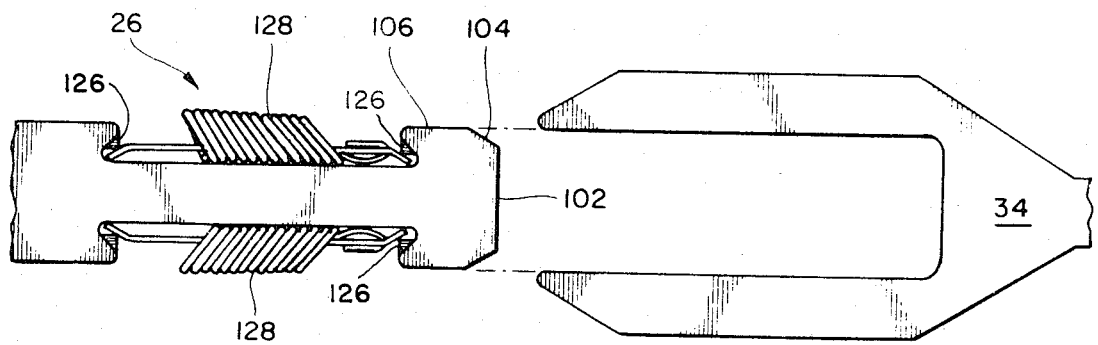
FIG. 7 is a side view of the mating portions of the connectors prior to engagement.
Figure 8:
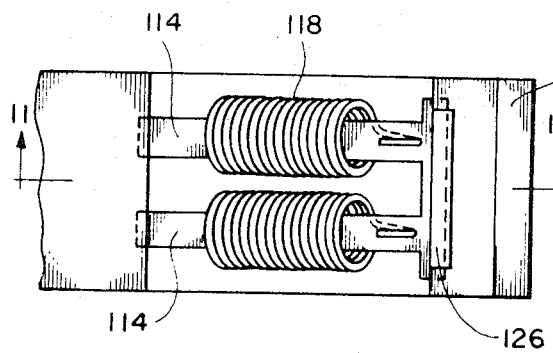
FIG. 8 is a top view of the male terminal connector shown in FIG. 7.
Figure 9:
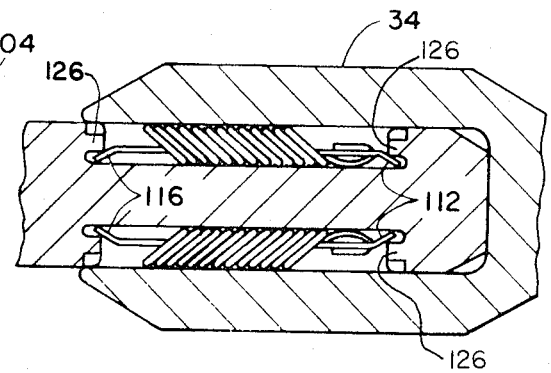
FIG. 9 is a sectional view of the connectors in fully engaged position taken along line 9—9 shown in FIG. 8.
Figure 10:
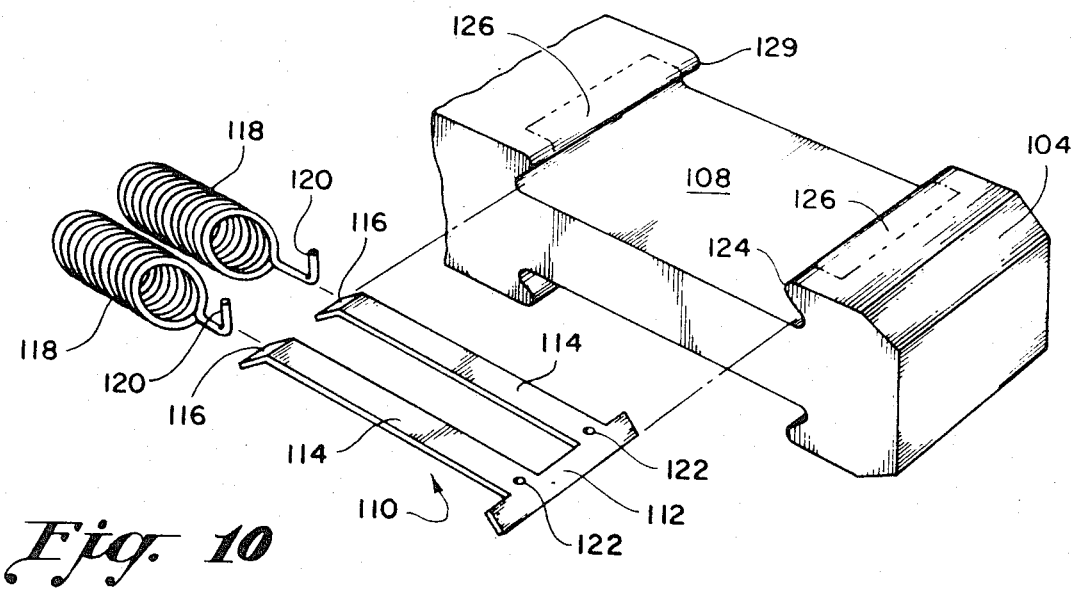
FIG. 10 is an exploded perspective view of the male terminal connector.

As seen in FIG. 7, the outer contact surface 128 of each conductive turn in coil 118 extends beyond the outer contact surface 106 prior to engagement of the male connector with female connector 34. The coils are then skewed upon engagement of the connectors, providing a plurality of conducting paths. A petroleum base joint compound may be applied to the contact surfaces of the helical coils 118 to provide a better connection as described in the earlier referenced co-pending Chabot application.

It is understood that various modifications may be made in the structure and methods shown and described herein without departing from the spirit and scope of the invention, and it is intended that these modifications are to be comprehended within the meaning and range of equivalence of the appended claims.

I claim:

1. An improved draw-out circuit breaker having a plurality of line terminals and load terminals, a respective male connector extending from each said line terminal and from each said load terminal, each connector adapted to be received in a respective female connector of a switchboard which includes an interior rear wall, said male connectors comprising;

a generally rectangular shaped conductive block, said block having a base portion at one longitudinal end and an engaging portion at its opposite longitudinal end, said base portion and said engaging portion each including a top and bottom surface, said block being electrically connected to a respective terminal at said base portion, said engaging portion including a pair of channels in back-to-back relationship on said top and bottom surfaces respectively, each channel including a ridge at opposite ends thereof;

a clip member retained in each said channel, each clip member having a leg extending longitudinally within said respective channel intermediate said opposite ridges, a helical coil provided in each said channel in encircling relationship to said leg; and a crimp provided in a portion of each ridge securely engaging said clip member within each said channel.

2. An improved draw-out circuit breaker as claimed in claim 1, wherein said channel is of a predetermined depth and said helical coil encircling said leg comprises an outer diameter greater than said predetermined depth.

3. An improved draw-out circuit breaker as claimed in claim 1, wherein said helical coil is formed of a conductive material.

4. An improved draw-out circuit breaker as claimed in claim 1, wherein each leg of said clip member includes a hole and each helical coil is provided with end protions retained within said hole.

* * * * *